United States Patent Office 3,302,617
Patented Feb. 7, 1967

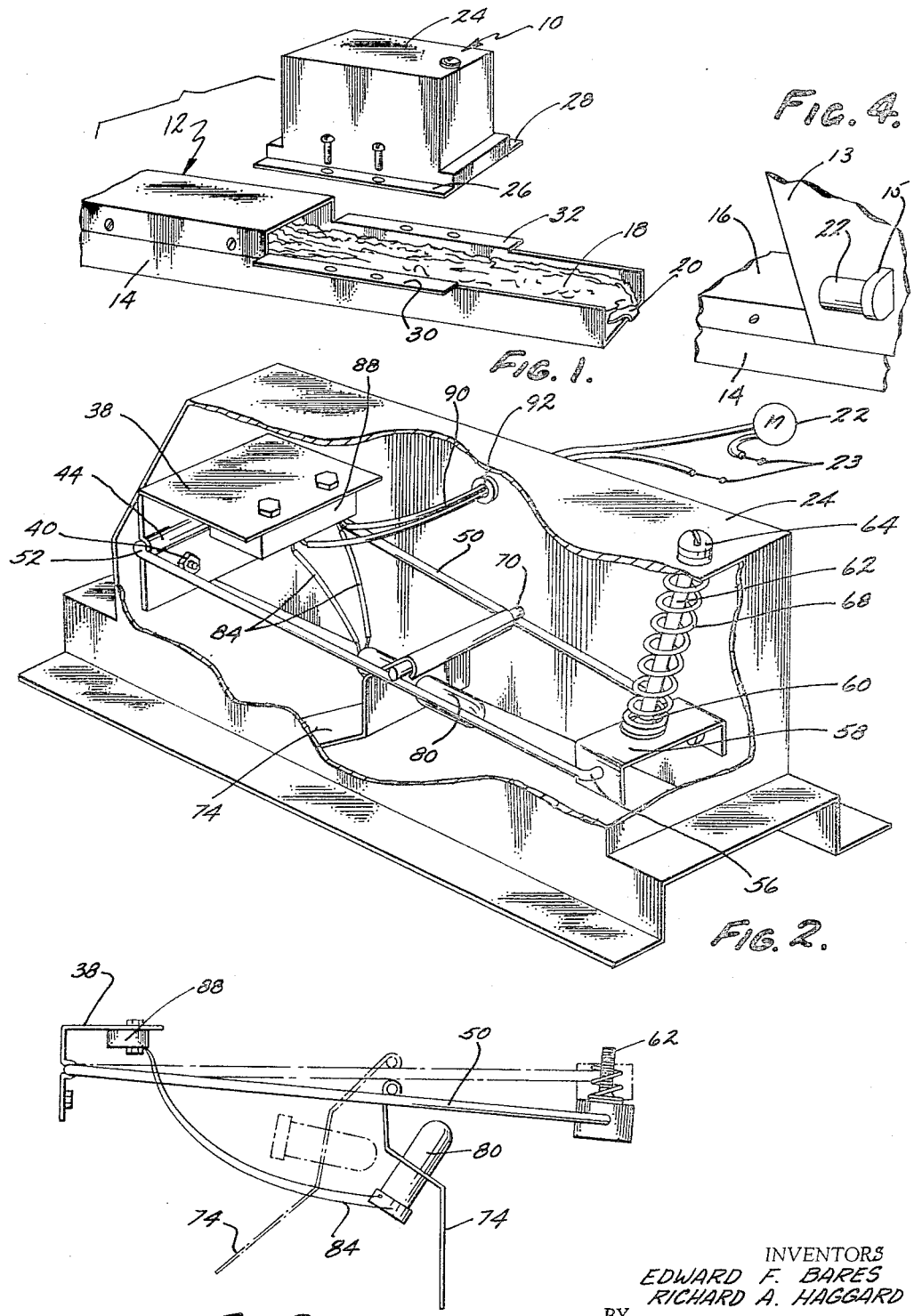

3,302,617
FLOW CONTROL APPARATUS FOR ELONGATED
FEED CONVEYORS FOR ANIMALS
Edward F. Bares, Grand Haven, Mich., and Richard A. Haggard, Nacogdoches, Tex., assignors to Big Dutchman, Inc., a corporation of Michigan
Filed May 7, 1964, Ser. No. 365,769
5 Claims. (Cl. 119—52)

This is a continuation-in-part application of copending application entitled, Animal Feeder System, Serial Number 274,484, filed April 22, 1963, now Patent 3,159,142.

This invention relates to automatic animal feeding equipment, and more particularly to feed a control unit for a feed conveyor trough.

Automatic animal feeding to be effective, requires dependable feed flow through the conveyor system. Feed conveying equipment is regularly arranged to operate for specific pre-set time intervals to regulate the quantity of feed supplies. Since some automatic feeding equipment supplies feed to a large number of animals, mammoth outdoor hoppers are employed. The feed absorbs moisture and often hangs up in the hopper due to caking and/or bridging. Under these conditions, the conveyor will dispense only a fraction of the proper amount of feed.

It is therefore an object of this invention to provide a feed conveying and hopper system that assures dependable outflow of feed to the animals.

Another object of this invention is to provide mechanism attachable to the conveyor trough and dispensing hopper to operate only when necessary to break up feed bridges or overcome caking for a dependable feed flow from the hopper into the conveyor trough to a predetermined level the trough.

It is another object of this invention to provide a feed conveyor flow regulator that can be attached as a unit in to an existing conveyor trough by use of of only a few simple connectors. Attachment is simple, rapid and requires no skill. The unit can be easily removed to allow complete access for repair. Repair moreover is relatively simple. The parts of the assembly can be completely dismounted with only a wrench and a screwdriver.

Another object of this invention is to provide a feed conveyor flow controller allowing varying, easily adjustable total feed flow control by sensing of the feed level in the trough. This is obtainable merely with a twist of the wrist. Moreover, adjustment control is achieved without removing the special unit from the conveyor, but merely by turning the external head of an adjusting bolt or its equivalent.

It is another object of this invention to provide a feed flow control unit wherein the entire set of cooperative components are completely enclosed within a housing over the conveyor. No components such as switches need be mounted externally of the housing. No shafts extend through the housing wall, and therefore, no special bearings are required in the wall to receive such a shaft. Even though the elements are all enclosed in the housing, yet there are no exposed switch contacts inside the housing to be contaminated by the feed. Also the parts are not susceptible to jamming with feed particles. The components are relatively simply and inexpensive to manufacture.

These and several other objects of this invention will become apparent upon studying the following specification in conjunction with the drawings in which:

FIG. 1 is a perspective view of a section of feed trough with the novel housing unit to be attached exploded slightly therefrom;

FIG. 2 is a perspective enlarged view of the novel attachment control unit, with the housing shown partly cut-away to illustrate the interior of the mechanism;

FIG. 3 is a fragmentary enlarged side elevational view of the operating components of the assembly in FIG. 2 shown in different operative positions; and FIG. 4 is a fragmentary enlarged perspective view of the hopper end of the conveyor showing the vibrator positioned on the hopper.

Referring now specifically to the drawings, the novel regulator unit 10 is shown combined with a feed conveyor trough 12 supplied from a hopper 13 having a vibrator 15 and motor 22 mounted thereon at the boot.

The feed conveyor trough 12 includes a bottom, generally U-shaped, trough type feed containing member 14 with a cover 16 attached thereto. The feed 18 is conveyed through the trough by a traveling element 20, such as the chain illustrated in U.S. Patent No. 2,737,823.

The feed detector and controller unit 10 is mounted at a desired position along the trough, preferably near to hopper 13.

The enclosure housing 24 of the regulator 10 is basically inverted and U-shaped in cross section, having an open bottom, a pair of end walls integrally attached to side walls, and a top wall. The lower side of the housing includes a pair of mounting flanges 26 and 28 which engage the conveyor trough flanges 30 and 32 for attachment by screws 34 through the aligned openings. Instead of these laterally extending flanges, this housing may be attached with a downwardly extending flange just like cover 16, if desired.

In the downstream end of the elongated housing is a right angle plate bracket 38 secured by bolt 40 to the end wall of the housing. The flange of this bracket attached against the end wall of the housing includes a stamped concavity which, when fitted against the wall (FIG. 4), forms an elongated horizontal pivot socket with an axis transverse to the housing and trough.

Extending longitudinally of the housing is an elongated support arm 50. It is formed of a pair of spaced, bartype segments interconnected by a transverse crosspiece 52 fitted within socket 44. Thus, arm 50 is vertically shiftable on the pivot mount formed with this socket.

The opposite end of arm 50 includes a pair of stub fingers 56 extending toward each other and interfitted with a generally inverted U-shaped plate 58. This plate includes a threaded portion 60 which receives the lower end of an elongated threaded stud 62. The head 64 of the stud extends through the top of housing 24 for external access thereto.

In the preferred form of the invention, the opening through the top of the housing is large enough to pass the threaded stud but not large enough to pass its head, with the stud not being threadably engaged therewith. Rotation of the stud (shown as a screw) can cause bracket plate 58 and thus the adjacent end of arm 50 to be raised and lowered. A compression spring 68 around the stud, extending between plate 58 and the bottom surface of the top of housing 24, forces the arm down when the screw is turned in the opposite direction. Of course, it is conceivable that this screw mount might be varied somewhat so that the threads on the stud can be threadably engaged with the housing, and the lower ends merely would include a bearing mount, to cause the raising and lowering.

Mounted intermediate the ends of arm 50 is a fixed transverse bar 70 which has an axis parallel to socket 44. Attached to this bar and depending therefrom is a sensor flap 74. It includes a socket on its upper end fitting around bar 70, an intermediate switch mounting section at an obtuse angle to the upper end, and a lower diagonal portion which extends beneath the lower surface of housing 24 to depend into trough 14. In its lowered position, the weight of this flap retains it in the depending position illustrated in solid in FIG. 3, so that the intermediate section is diagonal, and the sensing lower part is vertical.

When feed is conveyed through the trough in the direction indicated by the arrow in FIG. 1, it pivots this flap about its pivot axis to raise it to the position illustrated in phantom in FIG. 3. This rotates the intermediate portion in a position past vertical, to be tilted slightly in the opposite direction. The lower portion is then diagonal toward the feed flow direction. Attached across the intermediate portion of this pivotal flap is an enclosed mercury switch housing 80. As the flap moves between the two described positions the switch tilts from a position with one end down to a second position with the other end down. The angle on the intermediate portion of the flap determines whether the mercury will close the circuit. When in the position illustrated in solid lines in FIG. 3 the mercury is at the lowered end to complete the circuit across the internally extending contacts of the pair of leads 84. However, when flap 74 is pivoted upwardly by the feed, the mercury switch tilts in the opposite direction as indicated by the phantom lines in FIG. 3, to break the contact by flow of the mercury to the opposite end of the housing.

The operational axis of the switch is therefore in a plane transverse to the pivot axis of the sensor flap, and transverse to the direction of flow of the feed in the trough.

The leads extending from this mercury switch are preferably attached to a terminal block 88 secured to the upper leg of bracket 38. Additional connected leads 90 extend from this terminal block through an opening 92 in the side of the housing, to be operably connected with vibrator motor 22 for vibrator 15 and with power supply means 23. The vibrator arrangement may be of the type in co-pending patent application entitled Live Bottom Bin and Chain Feed System, Serial Number 365,582 filed May 7, 1964.

OPERATION

It will be noted that the mechanism is readily attachable to a conveyor trough when it is to be incorporated into the automated system. Screws 34 are attached after a corresponding piece of cover 16 is removed to make room for housing 24. When housing 24 is secured in position on the conveyor trough, the lower end of sensor flap 74 depends down into the conveyor trough.

The lower end of the flap is at a specific selected height to exactly control the activation of the vibrator motor 22. This is achieved by adjustment of stud 62 by turning screw head 64 (or its equivalent) from the exterior.

Normally a timer is provided to actuate the conveyor chain for pre-set time intervals to feed the stock.

The novel control mechanism, mounted immediately adjacent the dispensing hopper to assure flow of feed therefrom, helps to maintain constant flow of feed. As long as the feed flows smoothly from the hopper to the conveyor, the sensor flap is held pivoted in the elevated position shown in phantom lines in FIG. 3. The mercury switch is then inactive because the mercury is at the end of the tube opposite the electrical contacts.

When feed in the conveyor trough drops because of failure of dispensing from the hopper, due for example to caking or bridging in the hopper, pivot flap 74 drops by gravity bias to the lowered position shown in solid lines in FIG. 3. This causes the circuit to be completed across the contacts of leads 84 since the mercury flows to the other end of the tilted mercury switch housing 80. The circuit is thus closed across leads 90 to the vibrator motor 22 mounted on the hopper and the power supply terminals 23. Consequently, the vibrator motor is activated to vibrate the hopper and cause dispensing of feed into the conveyor trough. As soon as the feed is smoothly flowing again, it builds up to a predetermined level in the trough and pushes the sensor flap to the raised tilted position illustrated in phantom lines in FIG. 3. This causes the mercury to flow away from the end of the containing electrical contacts of leads 84. The motor is thus shut off until needed again.

Various additional advantages not specifically pointed out but resulting inherently from this novel combination will occur to those in the art upon studying the foregoing form of the invention. Also, it is conceivable that the preferred detailed structure of the apparatus could be modified slightly to achieve the unique results and operation, yet without departing from the concept presented. Therefore this application is to be limited only by the scope of the appended claims, and the reasonable equivalents thereto, rather than to the specific exact structure set forth and preferred.

We claim:

1. A feed level control unit for attachment to an animal feed conveyor trough comprising: an enclosure support; a mount inside said support; adjustable means retaining said mount in said support, and allowing vertical adjustment of said mount; said adjustable means including operative portions accessible from the exterior of said support to allow convenient adjustment thereof; a feed sensor suspended from said mount and having vertical movement relative to said mount in response to the feed level in the conveyor trough; and switch means in said housing operably associated with said mount in a position to be actuated thereby with a predetermined vertical movement of said sensor.

2. A feed level responsive apparatus for an animal conveyor trough comprising: a housing formed to fit over and be attached to a feed conveyor trough; means in said housing forming a pivotal support mount having an axis transverse to the direction of feed flow when said housing is attached to a conveyor trough; an arm pivotally engaged with said mount; a support extending between said arm and said housing to secure it in a selected vertical position; said support having an adjustable attachment between said arm and said housing, and having portions outside said housing allowing vertical adjustment of said arm in said housing; a feed level sensor pivotally mounted on and transverse to said arm and depending therefrom, said sensor having vertical movement relative to said mount in response to feed passing beneath said housing; and a mercury switch attached to said sensor and movable therewith, with electrical control leads extending from said switch outside said housing.

3. A feed level responsive unit for attachment to an animal feed conveyor trough, comprising: an elongated enclosure support housing having a generally inverted U-shaped cross section and including means for attachment to a conveyor trough with its elongated dimension in the direction of feed flow; means on said housing forming a pivotal support socket having a horizontal axis transverse to the elongated dimension of said housing; an elongated support arm having one end pivotally secured in said socket to allow movement vertically in said housing; an adjustment stud threadably engaged with said arm at a position displaced from said pivotal socket, extending up through and in engagement with said housing and terminating in an external adjusting head; a depending sensor flap having its upper end pivotally mounted to said arm on a pivot axis parallel to said arm pivot axis and normally depending beneath the bottom of said housing to extend into the feed conveyor trough; the operative height of said flap being adjustable by adjustment of said stud and an enclosed mercury switch attached to shift with said flap and be actuated.

4. A feed level responsive unit for attachment to an animal feed conveyor trough, comprising: an elongated enclosure support housing; an elongated support arm having one end pivotally secured to allow movement vertically in said housing; and an adjustment element engaged with said arm at a position displaced from the pivotal axis, in engagement with said housing, and terminating in an adjusting head; a depending sensor flap having its upper end pivotally mounted on said arm on a pivot axis parallel to said arm pivot axis and normally depending beneath the bottom of said housing to extend into the feed conveyor trough; said flap having a vertical movement relative to said mount; and an enclosed mercury switch attached to move with said flap and be actuated; the operative height of said flap being adjustable by adjustment of said stud.

5. In an animal feed hopper and conveyor system including a supply hopper, a conveyor trough in operative relation to said hopper to be supplied thereby, and movable conveyance means in said trough; motor operated vibrator means mounted on said hopper; feed level control apparatus on said trough including a housing formed to fit over and be attached to a feed conveyor trough; means in said housing forming a pivotal support mount having an axis transverse to the direction of feed flow when said housing is attached to a conveyor trough; an arm pivotally engaged with said mount; a support extending between said arm and said housing to secure it in a selected vertical position; said support having an adjustable attachment between said arm and said housing, and having portions outside said housing allowing vertical adjustment of said arm in said housing; a feed level sensor pivotally mounted transverse to said arm and depending therefrom, to be pivotally shifted vertically by the feed passing beneath said housing; and a mercury switch attached to said sensor and shiftable therewith, with electrical control leads extending from said switch outside said housing to said motor operated vibrator means to control feed level by controlled actuation of said vibrator means for controlled hopper dispensing.

References Cited by the Examiner

UNITED STATES PATENTS

| 1,460,573 | 7/1923 | Church et al. | 222—55 |
| 2,311,747 | 2/1943 | Gooch | 198—169 |
| 2,366,075 | 12/1944 | Weyandt | 222—55 |
| 2,745,539 | 5/1956 | Hazen | 198—37 |
| 2,926,629 | 3/1960 | Hazen | 119—52 |
| 3,033,163 | 5/1962 | Hostetler et al. | 119—52 |

SAMUEL KOREN, *Primary Examiner.*

ALDRICH F. MEDBERY, *Examiner.*